(12) United States Patent
Bringert et al.

(10) Patent No.: US 9,047,012 B1
(45) Date of Patent: Jun. 2, 2015

(54) USING INFORMATION FROM A USER DEVICE AND A SERVER TO SUGGEST AN INPUT

(75) Inventors: Bjorn E. Bringert, Bath (GB); Nicholas B. Weininger, San Francisco, CA (US)

(73) Assignee: Google Inc., Mountain View, CA (US)

( * ) Notice: Subject to any disclaimer, the term of this patent is extended or adjusted under 35 U.S.C. 154(b) by 416 days.

(21) Appl. No.: 13/470,464

(22) Filed: May 14, 2012

(51) Int. Cl.
*G06F 17/00* (2006.01)
*G06F 3/0488* (2013.01)

(52) U.S. Cl.
CPC .................. *G06F 3/04886* (2013.01)

(58) Field of Classification Search
CPC . G06F 17/273; G06F 17/276; G06F 3/04886; G06F 17/24
USPC .................. 715/273, 276, 257, 773
See application file for complete search history.

(56) References Cited

U.S. PATENT DOCUMENTS

| | | | |
|---|---|---|---|
| 8,102,368 B2 | 1/2012 | Fux et al. | |
| 8,176,419 B2 | 5/2012 | Zhu et al. | |
| 8,201,086 B2 | 6/2012 | Kritt et al. | |
| 8,645,825 B1 * | 2/2014 | Cornea et al. | 715/257 |
| 2009/0106224 A1 * | 4/2009 | Roulland et al. | 707/5 |
| 2010/0251161 A1 * | 9/2010 | Fong et al. | 715/773 |
| 2012/0050188 A1 * | 3/2012 | Andersson et al. | 345/173 |

* cited by examiner

*Primary Examiner* — Stephen Hong
*Assistant Examiner* — Matthew Ludwig
(74) *Attorney, Agent, or Firm* — Fish & Richardson P.C.

(57) ABSTRACT

Systems may include receiving, from the user device, data representing input to a virtual keyboard on the user device, where the virtual keyboard includes keys, and the data represents least one of: locations at which the keys were selected and durations for which the keys were selected. The systems may include using the data to identify character strings; and performing a spellcheck on the character strings to identify candidates for the character strings. The systems may also include determining popularities of the candidates; selecting one or more of the candidates based on popularity and ranking of the one or more candidates; and outputting the selected one or more candidates.

25 Claims, 6 Drawing Sheets

USING INFORMATION FROM A USER DEVICE AND A SERVER TO SUGGEST AN INPUT

BACKGROUND

This disclosure relates generally to using information from a user device and a server to suggest an input.

An electronic device, such as smartphone, typically includes a virtual keyboard for inputting information. The virtual keyboard includes characters areas, or virtual keys, which are selected to input a corresponding character. More specifically, the electronic device receives an input, such as a touch, on the virtual keyboard, and makes a determination as to which character was selected based on that input. In making the determination, the electronic device may take into account, e.g., where the touch occurred relative to a character on the virtual keyboard, and how long the touch occurred at that location, among other things.

A server, which receives input from numerous electronic devices over the course of time, is able to make determinations about the content of that input. For example, the server is able to determine which content is received most frequently, and the frequency at which that content is received. The server is also able to perform other types of processing, such as spelling and grammatical checks on input received from a user device.

SUMMARY

Described herein are examples of systems for using information from a user device and a server to suggest an input. The systems may include receiving, from the user device, data representing input to a virtual keyboard on the user device, where the virtual keyboard includes keys, and the data represents least one of: locations at which the keys were selected and durations for which the keys were selected. The systems may also include using the data to identify character strings; and performing a spellcheck on the character strings to identify candidates for the character strings, where the candidates are ranked by the spellcheck according to likelihood that a respective candidate is a correct spelling of a word corresponding to the character string. The systems may also include determining popularities of the candidates, where each of the popularities is for a search query that uses a respective candidate; selecting one or more of the candidates based on popularity and ranking of the one or more candidates; and outputting, to the user device, the selected one or more candidates. The systems may also include one or more of the following features, either alone or in combination.

Rankings of the one or more candidates may include probabilities that the one or more candidates are correct spellings of the word. The data may also represent at least one of an amount of pressure applied to the keys and the input to the virtual keyboard that does not register as a key press.

The selected one or more candidates may include more than one candidate, and the systems may include ranking the more than one candidate prior to output. The systems may include receiving an input from the user device, where the input identifies one of the more than one candidates; and performing an action using the identified candidate. The action may include performing a search of an online database for content that corresponds to the identified candidate, and/or submitting the identified candidate to a text-to-speech conversion engine for performing a text-to-speech conversion on the identified candidate.

Other examples of systems for using information from a user device and a server to suggest an input may include receiving, from the user device, candidates for input to the user device, where the candidates are words that are ranked and that are determined by the user device using input to a virtual keyboard on the user device, where the virtual keyboard includes keys, and where the input includes at least one of: locations at which the keys were selected and durations for which the keys were selected. Such systems may include determining popularities of the candidates, where each of the popularities is for a search query that uses a respective candidate; selecting one or more of the candidates based on popularity and ranking of the one or more candidates; and outputting, to the user device, the selected one or more candidates. Such systems may also include one or more of the following features, either alone or in combination.

Rankings of the one or more candidates may include probabilities that the one or more candidates are correct spellings of a word. The data may also represent at least one of an amount of pressure applied to the keys and the input to the virtual keyboard that does not register as a key-press.

Selected one or more candidates may include more than one candidate, and the systems may include ranking the more than one candidate prior to output. The systems may include receiving an input from the user device, where the input identifies one of the more than one candidates; and performing an action using the identified candidate. The action may include performing a search of an online database for content that corresponds to the identified candidate, and/or submitting the identified candidate to a text-to-speech conversion engine for performing a text-to-speech conversion on the identified candidate.

Two or more of the features described in this disclosure/specification, including this summary section, may be combined to form embodiments not specifically described herein.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
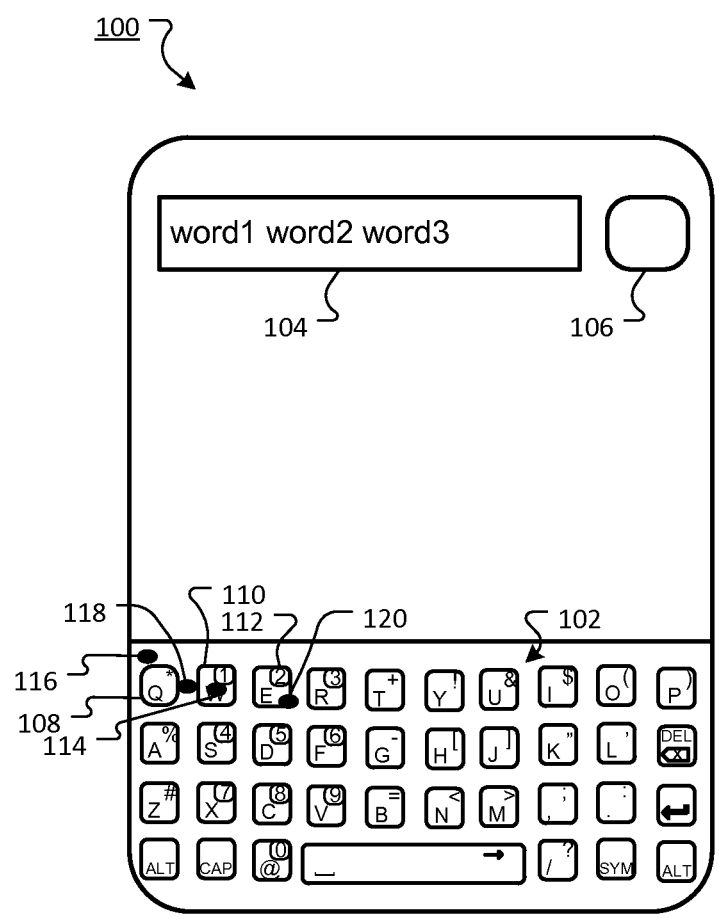
FIGS. 1 and 5 illustrate example user devices.

A user device presents a virtual keyboard containing virtual keys. Contacting (e.g., touching) the virtual keys, or other portions of the virtual keyboard, can result in input to the user device. Due to the size of some virtual keyboards, oftentimes user input is not always clear. For example, a user may touch a key unintentionally, touch a portion of the virtual keyboard between keys, touch a key for a relatively short period of time, and so forth. Such contact can result in inputs to the user device that are unintended. For example, a user intending to type "san francisco restaurants" may accidentally type "wan feqnxidcp testayfntd". The processes described herein may be used to suggest a correct spelling for an input such as this, and use that corrected spelling to perform an appropriate action.

In this regard, data input to a virtual keyboard can include, but is not limited to, a character string entered using the virtual keyboard, location information identifying where input was made relative to keys on the virtual keyboard, duration information indicating a duration for which the virtual keyboard was contacted to provide input, an amount of pressure applied to the virtual keyboard including the keys, and input to the virtual keyboard that does not register as a key press. This data may be used, e.g., by the user device itself or by a server, to identify one or more candidates for an input, such as "wan feqnxidcp testayfntd". For example, candidates words may be determined for the input, and probabilities (e.g., rankings) may be determined that indicate the likelihood that those candidate are particular words. For example character strings may be identified using the information provided above relating to entries on the virtual keyboard, and those character strings may be spell-checked to identify ranked candidates. For the above example, the candidates may include first-ranked "san francisco restaurants", second-ranked "san francisco rentals", third-ranked "san fernando restaurants", and so forth As described in more detail below, the above processing to determine the candidates, including the spellcheck, may be performed on the user device or on a server. The server may then determine popularities of the candidates. For example, the server may determine the popularities based on frequencies at which the candidates are used as search queries (e.g., where a candidate used at a higher frequency in search is deemed more popular than a candidate used at a lower frequency in search). The server may use this information, as well as the rankings determined earlier, to select one or more of the candidates to suggest as the user input. The selected candidates may be output to the user device (and appropriately ranked where more than one candidate is provided). So, in the example above, where the input is "wan feqnxidcp testayfntd", the recommended outputs may be first-ranked "san francisco restaurants", second-ranked "san fernando restaurants", third-ranked "san francisco rentals", and so forth. Notably, the rankings of "san franciso restaurants" and "san francisco rentals" are switched in the output because of the effect that the query for san fernando restaurants had on the result (e.g., the query for "san fernando restaurants" may have indicated popularity sufficient to override the spellcheck ranking of "san francisco rentals").

A user may select one of the suggested candidates, and the server may perform an action based on the selection, e.g., initiate a search using the selected candidate, submit the selected candidate to a text-to-speech conversion engine for performing a text-to-speech conversion on that candidate, and so forth.

The processes described herein, and variations thereof, may be implemented on any appropriate electronic system, with any appropriate computing devices and computing equipment. Examples of elements of such a system are described below with respect to FIGS. 1 and 2. Other systems, however, may be used to implement the processes described herein.

FIG. 1 illustrates an example user device 100. User device 100 can be, for example, a mobile device. User device 100 includes a keyboard 102, an input field 104, and a control 106. Keyboard 102 can be, for example, a virtual (e.g., "soft") keyboard; however, other types of keyboards may be used. Keyboard 102 can include various virtual keys in this example, where some or all of the keys can correspond to one or more characters. For example, keys 108, 110, and 112 can correspond to the characters "Q", "W", and "E", respectively.

A user of device 100 can touch keys on keyboard 102 to enter a character string into input field 104. For example, the user can use keyboard 102 to enter the character string "word1 word2 word3" (e.g., as currently displayed in input field 104). The user can select control 106 to perform an action using the entered character string. For example, the user can select the control 106 to request that a search be performed (e.g., by a search engine).

In the case where user device 100 is a mobile device, keyboard 102 can be a small keyboard (e.g., as compared to a full-sized keyboard device, such as used with a laptop or desktop computing device). The small size of the keyboard 102 can result in a higher frequency of typing errors as compared to a frequency of typing errors resulting from use of a full-sized keyboard. To facilitate correction of misspellings, user device 100 determines information that can be used (e.g., by the user device 100 and/or by a server) to suggest a spelling correction.

For example, the user device 100 can obtain information other than an entered character string. For example, the user device 100 can determine information identifying where input was made on keyboard 102 relative to keys on the virtual keyboard 102. For example, for each character of the character string, user device 100 can determine information indicating a location on the keyboard 102 where the user provided input that corresponds to the character. The user can provide input, for example, using a finger, a stylus, or some other input device.

For example, user device 100 can determine information describing example locations 114, 116, 118, and 120. Location 114 is a location that is within an area of keyboard 102 that is associated with a single key (e.g., location 114 is within the area of keyboard 102 that is associated with key 110). Location 116 is a location that is outside of each of the keys of keyboard 102 but closest to one of the keys (e.g., location 116 is closest to key 108). Location 118 is a location that is outside of each of the keys of keyboard 102 and equidistant from multiple of the keys of keyboard 102 (e.g., location 118 is outside of both of keys 108 and 110 and is equidistant from keys 108 and 110). Location 120 is a location that is partially within an area of keyboard 102 that corresponds to a key (e.g., location 120 is partially within the area of keyboard 102 that corresponds to key 112).

A location at which the virtual keyboard was touched can indicate a likelihood that a user intended to select a particular key. For example, location 114 that is entirely within key 110 can indicate a likelihood that the user intended to select key 110. As another example, location 120 that is partially within key 112 can indicate likelihood that the user intended to select key 112, where the likelihood associated with the location 120 is less than the likelihood associated with the location 114. A location that is outside of each of the keys of keyboard 102 can also indicate a likelihood that the user intended to select a particular key, but such likelihood can be less than the likelihoods associated with the locations 114 and 120. For example, the location 116 can indicate a likelihood that the user intended to select key 108. As another example, location 118 can indicate a likelihood that the user intended to select either the key 108 or the 110.

User device 100 can also determine a duration for which keyboard 102 was contacted to provide the input to keyboard 102. For example, a duration can be determined for each character of the character string. For example, user device 100 can determine durations of 100 ms, 10 ms, 90 ms, and 120 ms for inputs corresponding to locations 114, 116, 118, and 120, respectively. A duration associated with an input can indicate a likelihood that a user intended the input, where the longer the duration, the higher the likelihood. As another example, inputs having durations at least as long as a threshold duration can be determined to be intended inputs and inputs having durations less than the threshold can be determined to be unintended inputs. For example, if the threshold is 90 ms, the inputs corresponding to the locations 114, 118, and 120 can be determined to be intended inputs and the input corresponding to location 116 can be considered to be an unintended input (since its touch duration is below the threshold).

User device 100 can also determine, e.g., an amount of pressure applied to the virtual keyboard, including to the keys, and input to the virtual keyboard that does not register as a key press. For example, if a threshold amount of pressure is required to be applied to the virtual keyboard, then touches that exceed that pressure typically register as input, whereas touches that do not exceed that pressure do not typically register as input. Varying levels of pressure may correspond to a likelihood of an input. Input to the virtual keyboard that does not register as a key-press may include inputs outside the key area.

Figure 2:
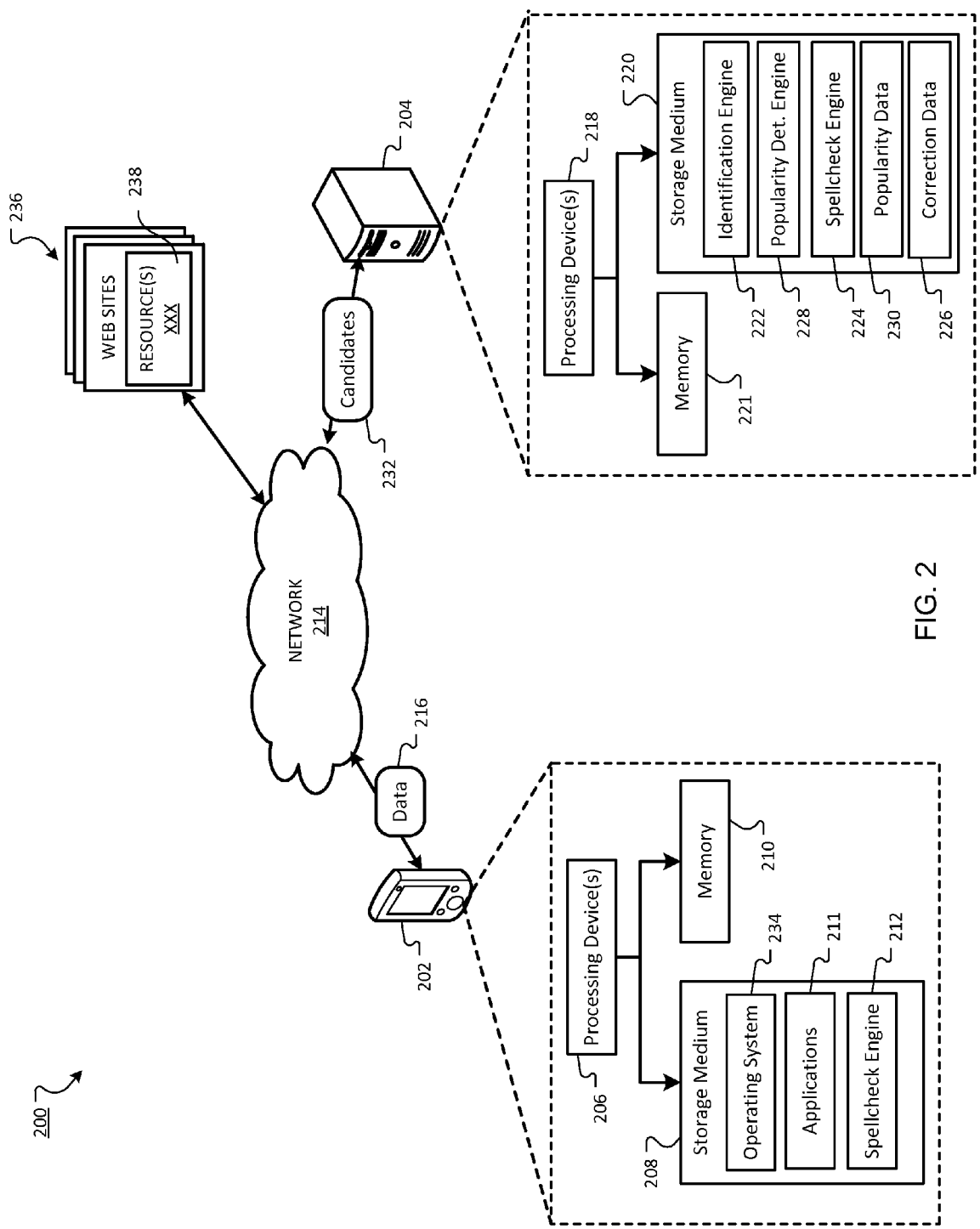
FIG. 2 is a block diagram showing, conceptually, an example system for using information from a user device and a server to recommend one or more candidates for a user input.

FIG. 2 is a block diagram showing, conceptually, an example system 200 for using information from a user device 202 (an example of which may be user device 100) and a server 204 to determine one or more suggested spelling corrections for an input to a virtual keyboard. User device 202 may include one or more processing devices 206, a storage medium 208, and memory 210. As described above, in this example, user device 200 is programmed to determine, among other information, location information identifying where input was made relative to keys on a virtual keyboard displayed on user device 200, duration information indicating a duration for which the virtual keyboard was contacted to provide input, an amount of pressure applied to the virtual keyboard including the keys, and input to the virtual keyboard that does not register as a key press.

In operation, a user may provide input to one or more applications 211 using a virtual keyboard. The input may be determined by taking into account the information described above, e.g., location and duration of a touch, and so forth. Taking this information into account may result in multiple character strings as candidates for the input. These character strings may, or may not, include typographical errors. In some implementations, user device 202 includes a spellcheck engine 212 to determine one or more spelling correction options for the character strings. Spellcheck engine 212 may generate ranked candidates as the spelling correction options, with each of the ranked candidates having an associated probability indicating that the ranked candidate is an accurate representation of the input character string. User device 202 can send the candidates (with probabilities) to server 204, over a network 214, e.g., as illustrated by data 216.

In some implementations, the foregoing processing, including spellchecking, may be performed in conjunction with server 204 or on server 204. Accordingly, in such implementations data 216 sent to server 204 includes location information identifying where input was made relative to keys on a virtual keyboard displayed on user device 200, duration information indicating a duration for which the virtual keyboard was contacted to provide input, an amount of pressure applied to the virtual keyboard including the keys, and/or input to the virtual keyboard that does not register as a key press. This character strings are processed by server 204 to determine the ranked candidates in a similar manner to that described above.

In this example, server 204 includes one or more processing devices 218, storage medium 220, and memory 221. Data 216 is received from the user device 202. In an example implementation, an identification engine 222 (described below) can identify one or more candidate character strings using one or more of location information identifying where input was made relative to keys on a virtual keyboard displayed on user device 200, duration information indicating a duration for which the virtual keyboard was contacted to provide input, an amount of pressure applied to the virtual keyboard including the keys, and input to the virtual keyboard that does not register as a key press. The character strings are processed by server 204 (e.g., by spellcheck engine 224) to determine the ranked candidates For example, the spellcheck engine 224 can obtain, from correction data 226, one or more spelling correction options for the character strings. The spelling correction options can include, for example, one or more corrections to common misspelled character strings received by other user devices. For example, a common misspelling of "San Francisco" may be "San Fransisco", and if the character string is the misspelled "San Fransisco", the spellcheck engine 224 can determine, such as based on the frequency of the spelling error being higher than a threshold, that the user intended to input "San Francisco". The spelling correction options may be ranked, with each resulting candidate including a probability that the candidate is an accurate representation of a word.

Regardless of whether the ranked candidates are determined at user device 202 or at server 204, a popularity determination engine 228 can identify popularities for each of the one or more ranked candidate character strings using popularity data 230. The popularities can indicate a number of times that the one or more candidate character strings have been received from one or more other user devices. The popularity determination engine 228 can identify one or more of the most popular candidate candidates. For example, the N most popular candidates can be selected where N is a positive integer (e.g., five). As another example, the candidates that have popularity above a threshold can be selected.

Using data from user device 202 and data from server 204 to determine candidates for user input can result in more accurate spelling corrections. That is, data available to mobile device 202, such as input location information and duration information, is not typically available to server 204. Likewise, data available to server 204, such as the popularity data, is not typically available to mobile device 202. By using information from both sources, it may be possible to more accurately estimate the intended input to the user device, and provide an appropriate recommendation or suggestion In this regard, server 204 selects one or more candidates for the input to mobile device 202. The selection, in this example, is based on the ranking (e.g., probability) produced by the spellcheck process and based on the popularity of each candidate in a search context. In a case where more than one candidate is selected, the selected candidates are ranked for output using this information. For example, for a particular candidate, the relatively high popularity of a search query using that candidate may override the relatively low probability resulting from a spellcheck to produce a highly-ranked candidate, and vice versa. After identifying one or more candidates, server 204 outputs data corresponding to the one or more candidates as suggestions to user device 202 (e.g., as illustrated by candidates 232). User device 202 can display the one or more suggestions (e.g., see FIG. 5 below) on a display screen. A user of user device 202 may select one of the displayed suggestions and an action can be performed using the selected suggestion. For example, the user-selected suggestion can be provided to server 204 or to another server for submission to a search engine, for submission to a text-to-speech conversion engine, and so forth. For example, a search of an online database can be performed to identify database entries that correspond to the selected suggestion.

As mentioned above, candidates for inputs may be determined by the identification engine 222 based, e.g., on one or more of location information identifying where input was made relative to keys on a virtual keyboard displayed on user device 200, duration information indicating a duration for which the virtual keyboard was contacted to provide input, an amount of pressure applied to the virtual keyboard including the keys, and input to the virtual keyboard that does not register as a key press. Identification engine 222 can, using such information, determine a likelihood that an input represents a character. As noted above, one or more candidate character strings may be identified by identification engine 222 using the information provided above.

For example, identification engine 222 can, for each character of the character string, determine a likelihood that an input is for a character. For example, the likelihood that the input is for a character can be based on whether the location of the input is within an area associated with a key, on the edge of an area associated with a key, or within an area that is not associated with any key. As another example, the likelihood that an input is for a character can be determined based on the input duration information, where, e.g., a longer duration indicates a higher likelihood that the input is for a character. In general, an input can be determined to be for a character if the input is greater than a threshold.

Identification engine 222 can identify a character string if touches (or other appropriate input to the virtual keyboard) are within a threshold distance of one or more keys other than a key associated with a particular character (e.g., the location input may correspond to a location that is between multiple keys (e.g., the key associated with the character and one or more other keys)). Identification engine 222 can determine an alternative character and can determine a character string by substituting one character for another character based on the user input. As another example, if the input duration for a character is less than a threshold, identification engine 222 can determine that the input represents an accidental input. In this regard, identification engine 222 can infer an intended or unintended input by removing a character from the character string.

Although the above example describes identification engine 222 included in the server 204, as noted above some or all of its functionality can be incorporated into user device 202

In the examples of FIGS. 1 and 2, and, user devices 100 and 202 are mobile computing devices. Generally, however, the user devices can be or include any appropriate type of computing device, examples of which include a desktop computer, a laptop computer, a tablet computer, a handheld computer, a personal digital assistant (PDA), a cellular telephone, a network appliance, a camera, a smart phone, a television having one or more embedded or attached processors, an enhanced general packet radio service (EGPRS) mobile phone, a media player, a navigation device, an email device, a game console, or a combination of two or more of these data processing devices or other appropriate data processing devices. In some implementations, the computing device can be part of a motor vehicle (e.g., an automobile, an emergency vehicle (e.g., fire truck, ambulance, a bus). Although only one user device 202 is depicted specifically in FIG. 2, system 200 can include any number of user devices.

Applications 211 may be pre-stored on user device 202, downloaded from a remote source, such as an online store, or obtained by any other appropriate mechanism. In other examples, the functionality of one or more of applications 211 may be part of an operating system 234 for user device 202.

Server 204 can represent various forms of servers, e.g., a Web server, an application server, a proxy server, a network server, or a server farm. Also shown in FIG. 2 are various Web sites 236, which are accessible to user device 202. A Web site 236 includes one or more resources 238 associated with a domain name and hosted by one or more servers. An example website 236 is a collection of Web pages formatted in hypertext markup language (HTML) that can include, for example, text, images, multimedia content, and programming elements, such as scripts. The resources available through the depicted Web sites may include, e.g., a search engine, a text-to-speech conversion engine, an electronic mail service, a short message service, a VOIP service, and so forth.

Network 214 can represent one or more communications networks that can allow devices (e.g., the user device 202, the server 204) to communicate, through a communication interface (not shown) which may include digital signal processing circuitry. The network(s) included in network 214 may be wired and/or wireless, and provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, e.g., using a Bluetooth, WiFi, or other such transceiver.

Figure 3:
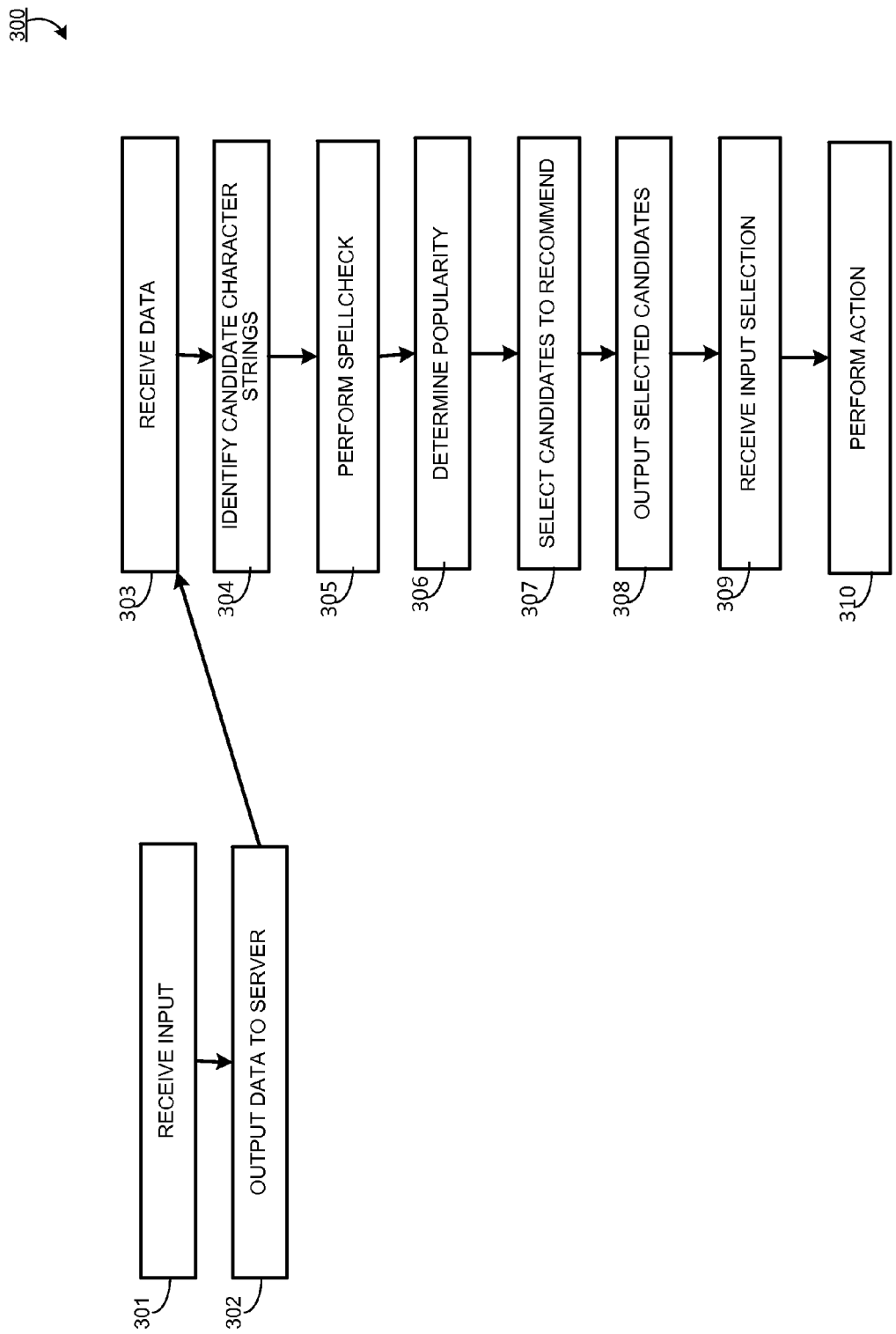
FIGS. 3 and 4 are flowcharts showing example implementations of processes that may be performed on the system of FIG. 2.

FIG. 3 is a flowchart showing an example process 300, which may be performed, e.g., on user device 202 and on server 204 to suggest one or more spelling corrections for an input to a virtual keyboard.

According to process 300, input is received (301) on the virtual keyboard of user device 202. This input is used to determine, e.g., location information identifying where input was made relative to keys on the virtual keyboard, duration information indicating a duration for which the virtual keyboard was contacted to provide input, an amount of pressure applied to the virtual keyboard including the keys, and input to the virtual keyboard that does not register as a key press. For example, the information can identify whether a corresponding input was made entirely or partially within an area of the virtual keyboard that corresponds to a key. As another example, the information can identify a distance between the input corresponding to a respective character and a respective key. As another example, the data can include information which indicates a force that was used to provide the input to the virtual keyboard. For example, the data can include information which indicates how "hard" or "strong" of a "tap" was used to input the respective character. This information (data) is output (302) to server 204.

The data is received (303) at server 204. Character strings are identified (304) using the received data. For example, as described above, identification engine 222 may use the above information to determine candidate character strings for the input. In this example, there are multiple candidate character strings; however, this need not be the case in all examples. A spellcheck process is performed (305) on the candidate character strings to identify one or more ranked candidates the various character strings. For example, the server can obtain one or more spelling correction options for each character string, where the spelling correction options may correspond to corrections to common misspelled character strings received by other user devices. The ranked candidates may include probabilities indicating the likelihood that each candidate is a representation of a corresponding character string.

Popularities of the resulting ranked candidates are determined (306). In this example, the popularities are indicative of frequencies at which the candidates were used in searching (by the user and/or others). For example, the popularities can correspond, for example, to a number of times that the one or more candidate text entries have been received from one or more other user devices. The popularities may be determined by consulting a database of popularity data.

One or more the candidates may be selected (307) based on their popularity and spellcheck ranking/probability. For example, one or more of the most popular candidate text entries can be identified. For example, the N most popular text entries can be identified. As another example, the candidate text entries that have popularity above a threshold can be identified. This information may be combined with the spellcheck ranking using any appropriate combinatorial techniques to generate a score for each candidate. The score may indicate that candidate's likelihood of representing the original user input. One or more candidates with the highest scores may be suggested as spelling corrections for the input provided to the user device.

The resulting candidates may be output (308) to user device 302, and ranked according to their scores. The user device may display the ranked candidates for selection, as explained below with respect to FIG. 5. In this regard, data for a user selection may be received (309), which identifies a ranked candidate. An action may be performed (310) on that ranked candidate. For example, a search may be initiated using the selected candidate, the selected candidate may be submitted to a text-to-speech conversion engine for performing a text-to-speech conversion on that candidate, and so forth. Selection and output may be performed by a data engine, which may be separate from, or the same as, the engines described hereinabove.

Figure 4:
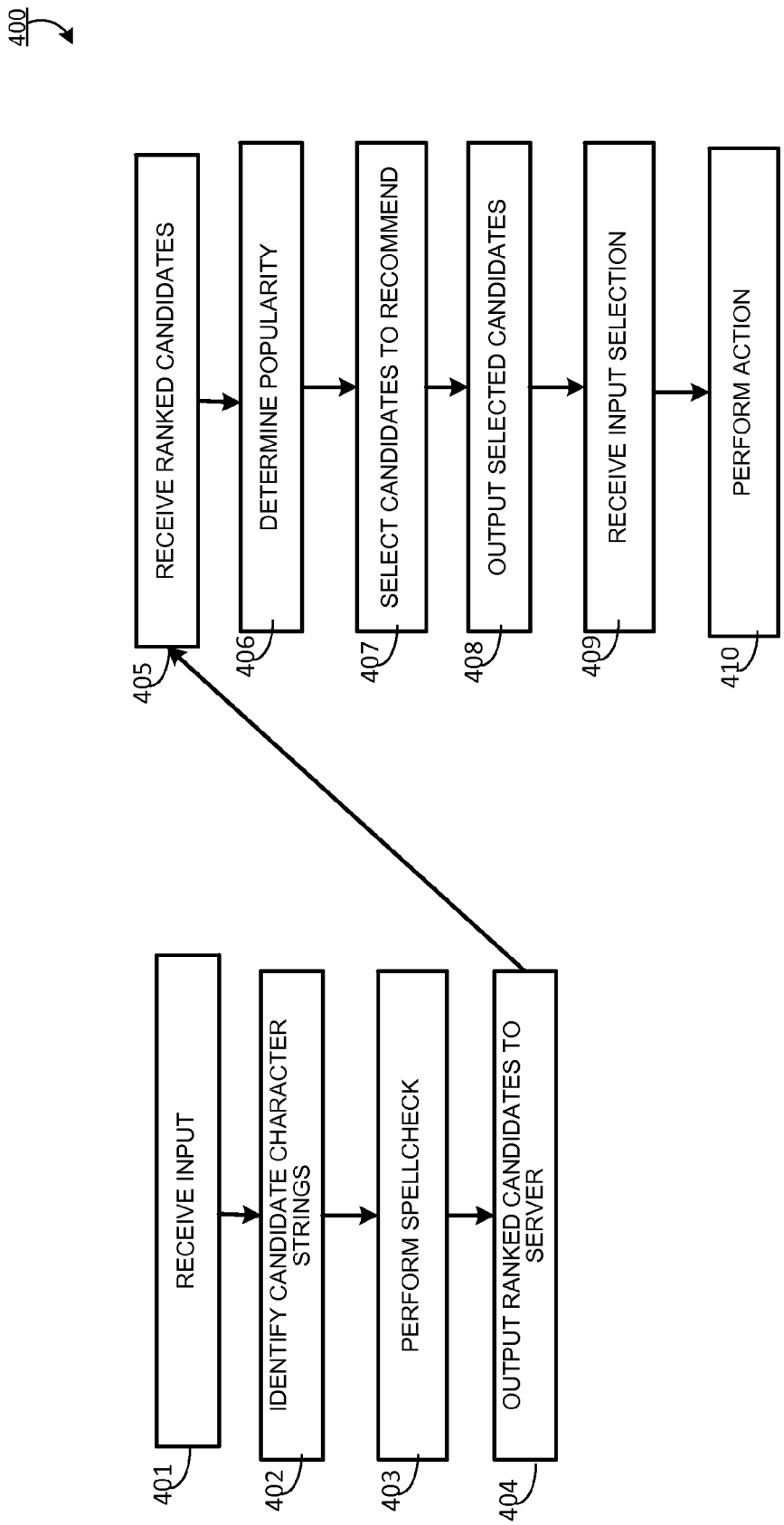

FIG. 4 is a flowchart showing an example process 400, which may be performed, e.g., on user device 202 and on server 204 to suggest one or more spelling corrections for an input to a virtual keyboard. The operations of FIG. 4 are similar to those of FIG. 3; however, where those operations are performed is different in FIG. 4. More specifically, in FIG. 4, operations 401 to 403, which include the spellcheck, are performed on user device 202. Thereafter, user device 202 outputs (404) the ranked candidates to server 204. Operations 406 to 410, which are performed on sever 204, are similar to operations 306 to 310, respectively.

Figure 5:
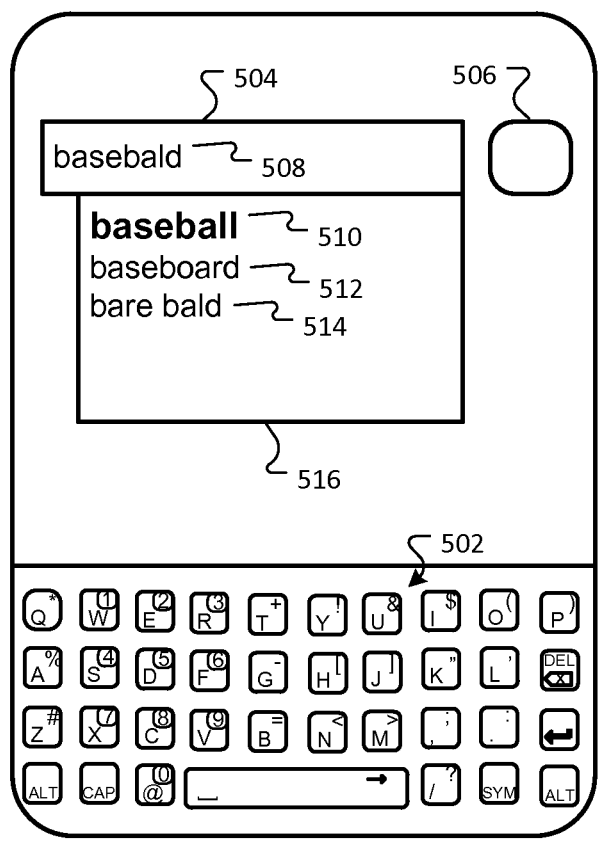

FIG. 5 illustrates an example user device 500, which may be similar to user device 100 of FIG. 1. In this example, a user enters a character string (e.g., a character string "baseabld" 508) into the input control 504. Processing then proceeds according to processes 300 or 400, or some variation thereof. This results in various ranked candidates 510, 512, and 514 that are suggested spelling corrections for input 508. The ranked candidates 510, 512, and 514 are displayed in a drop-down control 516 according to their rankings. The user can select one of the candidates 510, 512, or 514 (e.g., the user may select candidates 510, as indicated by the bold text of candidate 510). The user can select the control 506 to perform an action using the selected candidate 510. For example, the user can select the control 506 to request that a search be performed (e.g., by a search engine) using the selected candidate 510.

Figure 6:
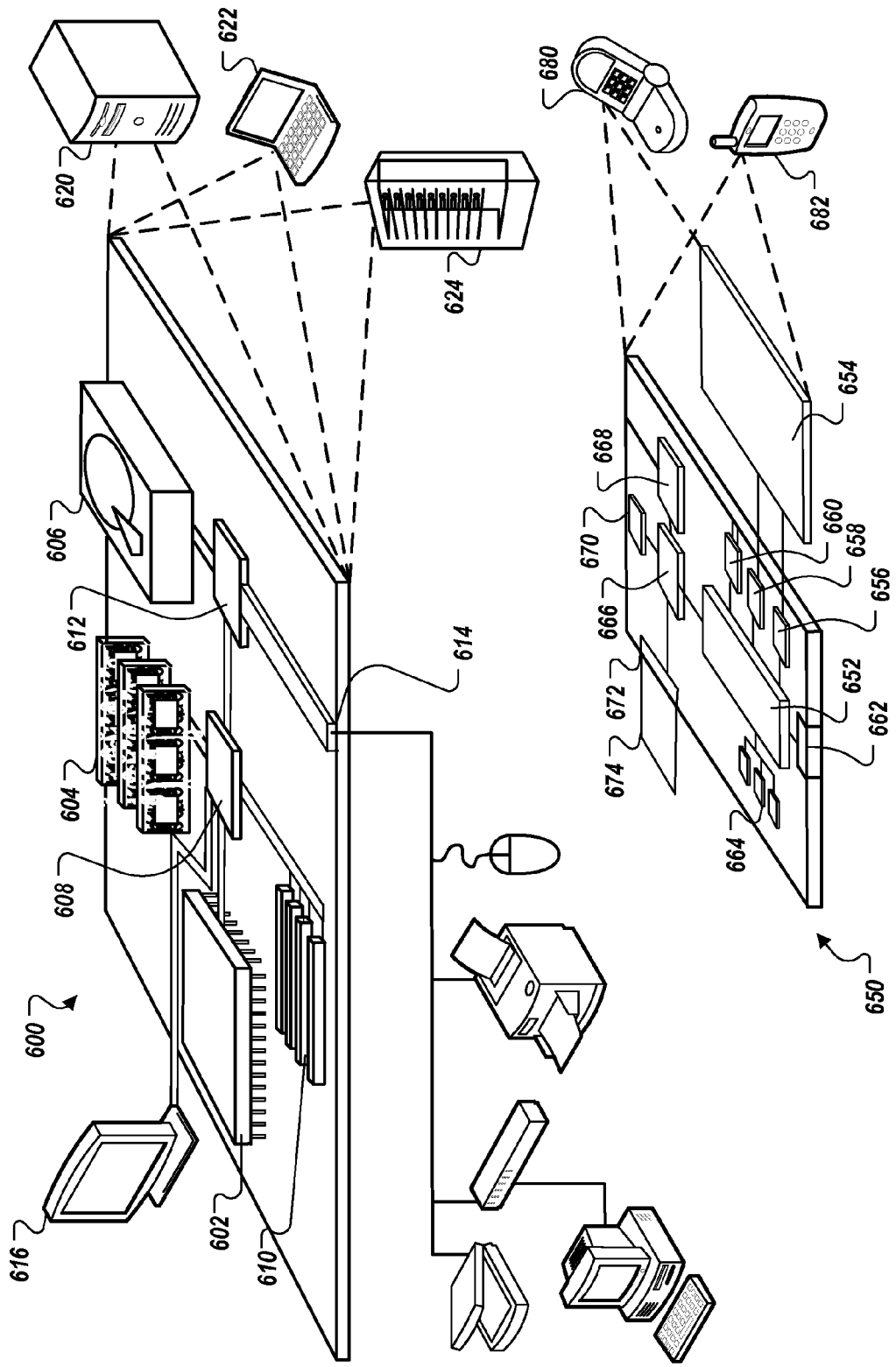
FIG. 6 shows examples of computing devices on which the processes described herein, or portions thereof, may be implemented.

FIG. 6 shows an example of a generic computing device 600 and a generic mobile computing device 650, which may be used to implement all or part of the processes described herein. For example, the server 204 may be implemented by computing device 600 and mobile computing device 650 may implement the user device 100 of FIG. 1, the user device 202 of FIG. 2, or the user device 500 of FIG. 5. Computing device 600 is intended to represent various forms of digital computers, e.g., laptops, desktops, workstations, personal digital assistants, servers, blade servers, mainframes, and other appropriate computers. Computing device 650 is intended to represent various forms of mobile devices, e.g., personal digital assistants, cellular telephones, smartphones, and other similar computing devices. The components shown here, their connections and relationships, and their functions, are meant to be examples, and are not meant to limit the implementations described and/or claimed in this document.

Computing device 600 is intended to represent various forms of digital computers, examples of which include laptops, desktops, workstations, personal digital assistants, servers, blade servers, mainframes, and other appropriate computers. Computing device 650 is intended to represent various forms of mobile devices, examples of which include personal digital assistants, cellular telephones, smartphones, and other similar computing devices. The components shown here, their connections and relationships, and their functions, are meant to be examples, and are not meant to limit the scope of the appended claims.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, for example, display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, examples of which include a magnetic or optical disk.

The storage device 606 is capable of providing mass storage for the computing device 600. In one implementation, the storage device 606 may be or contain a computer-readable medium, for example, a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 604, the storage device 606, memory on processor 602, or a propagated signal. For example, the information carrier may be a non-transitory, machine-readable storage medium.

The high speed controller 608 manages bandwidth-intensive operations for the computing device 600, while the low speed controller 612 manages lower bandwidth-intensive operations. Such allocation of functions is an example. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, examples of which include a keyboard, a pointing device, a scanner, or a networking device, for example, a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer, for example, a laptop computer 622. Alternatively, components from computing device 600 may be combined with other components in a mobile device (not shown), for example, device 650. Each of such devices may contain one or more of computing device 600, 650, and an entire system may be made up of multiple computing devices 600, 650 communicating with each other.

Computing device 650 includes a processor 652, memory 664, an input/output device for example, a display 654, a communication interface 666, and a transceiver 668, among other components. The device 650 may also be provided with a storage device, for example, a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, for example, control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided by the SIMM cards, along with additional information, for example, placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, examples of which include those described above. The information carrier is a computer- or machine-readable medium, for example, the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, for example, using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, for example, through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

The operations of processes 300 and 400 may be performed on different machines than those shown. Furthermore, additional or duplicate processing may be performed on either machine. For example, spellchecking may be performed on both the user device and the server, and the resulting candidates determined based on the ranked spellcheck results.

Other implementations not specifically described herein are also within the scope of the following claims.

What is claimed is:

1. A method performed on a server comprising:
receiving, from a user device, data representing one or more user inputs to a virtual keyboard on the user device, the virtual keyboard comprising keys, the data representing, for each user input, i) a first likelihood that the user input is a selection of a particular key of the keys based on a location of the user input to the virtual keyboard relative to the keys and ii) a second likelihood that the user input is a selection of the particular key based on a duration of the user input to the virtual keyboard;
identifying one or more character strings based on the first and the second likelihoods associated with the one or more user inputs;
for each of the one or more character strings, performing a spellcheck on the character string to identify candidates for the character string, the candidates being ranked by the spellcheck according to likelihood that a respective candidate is a correct spelling of a word corresponding to the character string;
for each of the candidates of the one or more character strings, determining a popularity of the candidate based on a frequency at which the candidate is used as a search query input to a search engine;
selecting one or more of the candidates based on the i) popularity of the candidates and the ii) ranking of the candidates; and
outputting, to the user device, the selected one or more candidates.

2. The method of claim 1, wherein rankings of the candidates comprise probabilities that the candidates are correct spellings of the word.

3. The method of claim 1, wherein the data also represents, for each user input, a third likelihood that the user input is a selection of the particular key based on an amount of pressure applied to the user device providing for display the virtual keyboard.

4. The method of claim 1,
further comprising ranking the one or more selected candidates.

5. The method of claim 4, further comprising:
receiving an input from the user device, the input identifying one of the selected one or more candidates; and
performing an action using the identified candidate.

6. The method of claim 5, wherein the action comprises performing a search of an online database for content that corresponds to the identified candidate.

7. The method of claim 5, wherein the action comprises submitting the identified candidate to a text-to-speech conversion engine for performing a text-to-speech conversion on the identified candidate.

8. A method performed on a server comprising:
receiving, from a user device, candidates for input to the user device, the candidates being words that are ranked and that are determined by the user device using data representing one or more user inputs to a virtual keyboard on the user device, the virtual keyboard comprising keys, the data representing, for each user input, i) a first likelihood that the user input is a selection of a particular key of the keys based on a location of the user input to the virtual keyboard relative to the keys and ii) a second likelihood that the user input is a selection of the particular key based on a duration of the user input to the virtual keyboard;
for each of the candidates, determining a popularity of the candidate based on a frequency at which the candidate is used as a search query input to a search engine;
selecting one or more of the candidates based on the i) popularity of the candidates and the ii) ranking of the candidates; and
outputting, to the user device, the selected one or more candidates.

9. The method of claim 8, wherein rankings of the candidates comprise probabilities that the candidates are correct spellings of a word.

10. The method of claim 8, wherein the data also represents, for each user input, a third likelihood that the user input is a selection of the particular key based on an amount of pressure applied to the user device providing for display the virtual keyboard.

11. The method of claim 8,
further comprising ranking the one or more selected candidates.

12. The method of claim 11, further comprising:
receiving an input from the user device, the input identifying one of the selected one or more candidates; and
performing an action using the identified candidate.

13. The method of claim 12, wherein the action comprises performing a search of an online database for content that corresponds to the identified candidate.

14. The method of claim 12, wherein the action comprises submitting the identified candidate to a text-to-speech conversion engine for performing a text-to-speech conversion on the identified candidate.

15. One or more non-transitory machine-readable storage media storing instructions that are executable by a server to perform operations comprising:
receiving, from a user device, data representing one or more user inputs to a virtual keyboard on the user device, the virtual keyboard comprising keys, the data representing, for each user input, i) a first likelihood that the user input is a selection of a particular key of the keys based on a location of the user input to the virtual keyboard relative to the keys and ii) a second likelihood that the user input is a selection of the particular key based on a duration of the user input to the virtual keyboard;
identifying one or more character strings based on the first and the second likelihoods associated with the one or more user inputs;
for each of the one or more character strings, performing a spellcheck on the character string to identify candidates for the character string, the candidates being ranked by the spellcheck according to likelihood that a respective candidate is a correct spelling of a word corresponding to the character string;
for each of the candidates of the one or more character strings, determining a popularity of the candidate based on a frequency at which the candidate is used as a search query input to a search engine;
selecting one or more of the candidates based on the i) popularity of the candidates and the ii) ranking of the candidates; and
outputting, to the user device, the selected one or more candidates.

16. The one or more machine-readable storage media of claim 15, wherein rankings of the candidates comprise probabilities that the candidates are correct spellings of the word.

17. The one or more machine-readable storage media of claim 16, wherein the data also represents, for each user input, a third likelihood that the user input is a selection of the particular key based on an amount of pressure applied to the user device providing for display the virtual keyboard.

18. The one or more machine-readable storage media of claim 16,
further comprising ranking the one or more selected candidates.

19. The one or more machine-readable storage media of claim 18, wherein the operations further comprise receiving an input from the user device, the input identifying one of the selected one or more candidates; and
performing an action using the identified candidate.

20. One or more non-transitory machine-readable storage media storing instructions that are executable by a server to perform operations comprising:
receiving, from a user device, candidates for input to the user device, the candidates being words that are ranked and that are determined by the user device using data representing one or more user inputs to a virtual keyboard on the user device, the virtual keyboard comprising keys, the data representing, for each user input, i) a first likelihood that the user input is a selection of a particular key of the keys based on a location of the user input to the virtual keyboard relative to the keys and ii) a second likelihood that the user input is a selection of the particular key based on a duration of the user input to the virtual keyboard;
for each of the candidates, determining a popularity of the candidate based on a frequency at which the candidate is used as a search query input to a search engine;
selecting one or more of the candidates based on the i) popularity of the candidates and the ii) ranking of the candidates; and
outputting, to the user device, the selected one or more candidates.

21. The one or more machine-readable storage media of claim 20, wherein rankings of the candidates comprise probabilities that the candidates are correct spellings of the word.

22. The one or more machine-readable storage media of claim 20, wherein the data also represents, for each user input, a third likelihood that the user input is a selection of the particular key based on an amount of pressure applied to the user device providing for display the virtual keyboard.

23. The one or more machine-readable storage media of claim 20,
further comprising ranking the one or more selected candidates.

24. A system including a processing device comprising:
- an identification engine, executable on one or more processors, to (i) receive, from a user device, data representing one or more user inputs to a virtual keyboard on the user device, the virtual keyboard comprising keys, the data representing, for each user input, a) a first likelihood that the user input is a selection of a particular key of the keys based on a location of the user input to the virtual keyboard relative to the keys and b) a second likelihood that the user input is a selection of the particular key based on a duration of the user input to the virtual keyboard, and to (ii) identify one or more character strings based on the first and the second likelihoods associated with the one or more user inputs;
- a spellcheck engine, executable on one or more processors, to perform, for each of the one or more character strings, a spellcheck on the character string to identify candidates for the character string, the candidates being ranked by the spellcheck according to likelihood that a respective candidate is a correct spelling of a word corresponding to the character string;
- a popularity determining engine, executable on one or more processors, to determine, for each of the candidates of the one or more character strings, a popularity of the candidate based on a frequency at which the candidate is used as a search query input to a search engine; and
- a data engine, executable on one or more processors, (i) to select one or more of the candidates based on the i) popularity of the candidates and the ii) ranking of the candidates, and (ii) to output, to the user device, the selected one or more candidates.

25. A system comprising:
- a popularity determining engine, executable on one or more processors, (i) to receive, from a user device, candidates for input to the user device, the candidates being words that are ranked and that are determined by the user device using data representing one or more user inputs to a virtual keyboard on the user device, the virtual keyboard comprising keys, the data representing, for each user input, a) a first likelihood that the user input is a selection of a particular key of the keys based on a location of the user input to the virtual keyboard relative to the keys and b) a second likelihood that the user input is a selection of the particular key based on a duration of the user input to the virtual keyboard, and to (ii) determine, for each of the candidates, a popularity popularities of the candidate based on a frequency at which the candidate is used as a search query input to a search engine; and
- a data engine, executable on one or more processors, (i) to select one or more of the candidates based on the i) popularity of the candidates and the ii) ranking of the candidates, and (ii) to output, to the user device, the selected one or more candidates.

* * * * *